Jan. 19, 1932.   G. H. MASON   1,841,832
CLOTH SHEARING MACHINE
Filed July 24, 1931   2 Sheets-Sheet 1

INVENTOR
George H. Mason,
BY HIS ATTORNEY

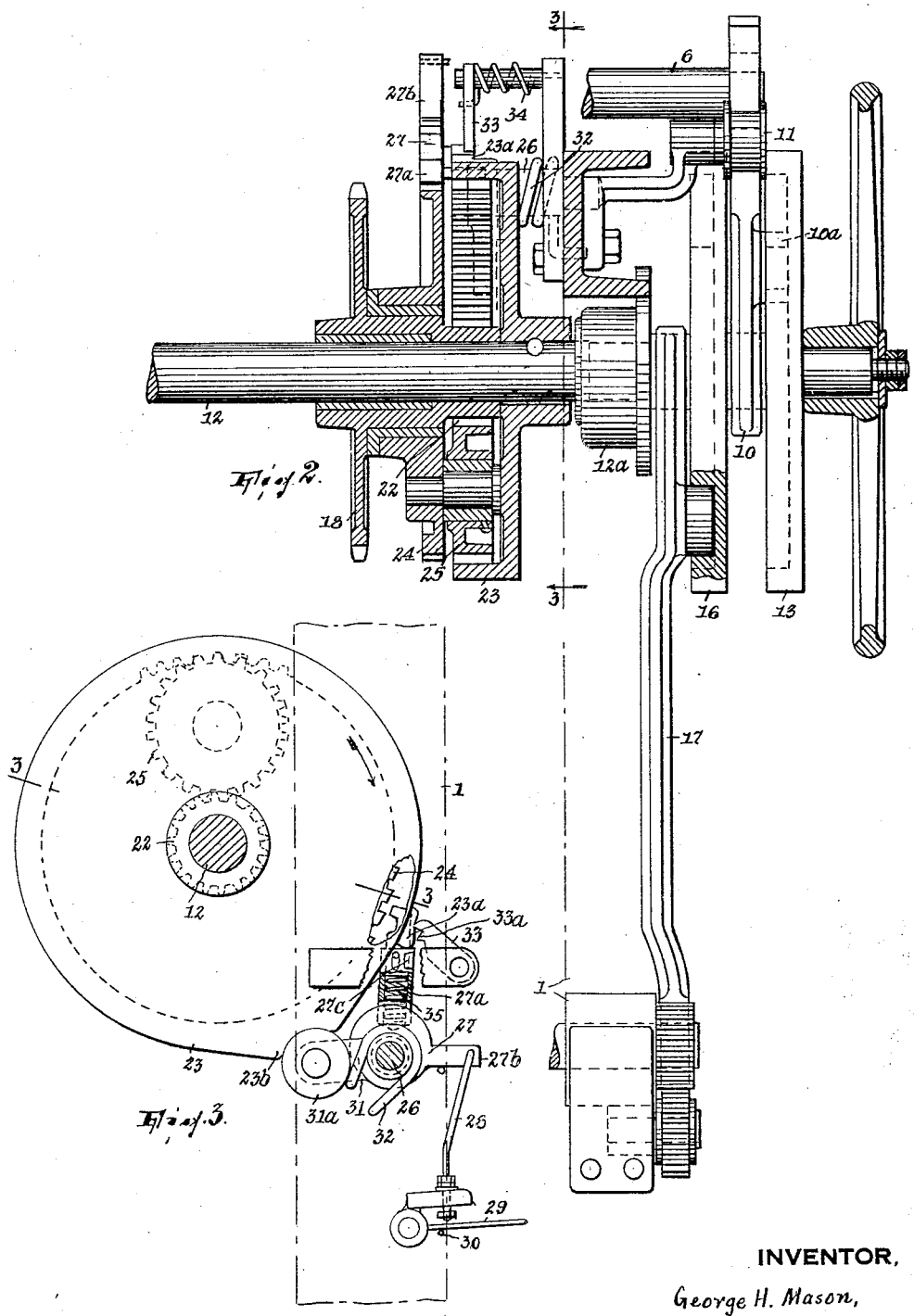

Patented Jan. 19, 1932

1,841,832

UNITED STATES PATENT OFFICE

GEORGE H. MASON, OF GLEN ROCK, NEW JERSEY, ASSIGNOR TO HERMAS MACHINE COMPANY, OF HAWTHORNE, NEW JERSEY, A CORPORATION OF NEW JERSEY

CLOTH SHEARING MACHINE

Application filed July 24, 1931. Serial No. 552,877.

This invention relates to machines for shearing the face or faces of a moving cloth of the class in which, given cloth shearing and cloth guiding means, as a cloth rest, one of the latter is movable to alter the space between them for some purpose, as to cause the cloth and shearing means to assume or cease to assume the proper relation to each other for shearing. The invention is an improvement on the mechanism disclosed in the patent to A. C. Mason No. 1,802,520 particularly in that the mechanism involved is simplified and made more reliable and efficient and much less liable to get out of order and more quiet in its operation.

In the drawings,

Fig. 2 is a fragmentary view mainly in section on line 2—2, Fig. 1, but showing certain parts in plan; and Fig. 3 is a section on line 3—3, Fig. 2.

Figure 1:
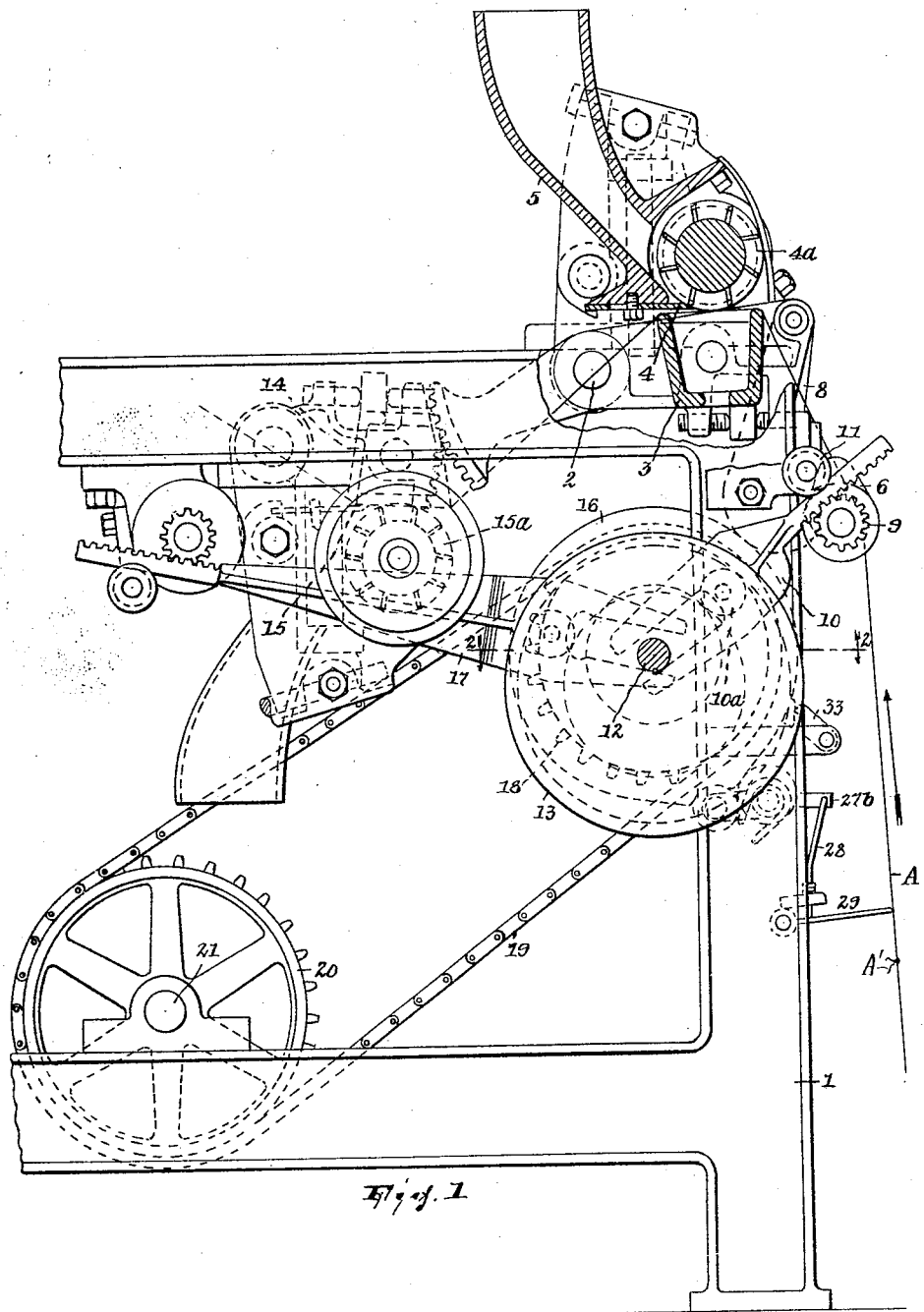
Fig. 1 is a side elevation, partly in section, of so much of the improved fabric shearing machine as is necessary to illustrate the invention.

The frame 1; its horizontal shaft 2; the cloth-guiding instrumentality consisting of the cloth-rest 3 movable from and toward the shearing means; such shearing means, comprising the fixed shear 4 and the suitably rotated shear 4a; the housing 5 for shear 4a; the lever structure 6 fulcrumed in the frame and linking means 8 pivotally connecting it with the cloth-rest, such lever structure and means forming a toggle connection between the cloth-rest and frame; the pinion 9 on said lever structure; the forked rack 10 intergeared with pinion 9 and confined between it and the guide roller 11; the main shaft 12 journaled in the frame at 12a, and the cam 13 fixed thereon and engaged by a roller 10a on the rack 10, are or may be all substantially the same as in the aforesaid patent. It will be understood that if the fabric is to be sheared on both sides certain parts, notably the cloth-guiding means, shearing means, cam and rack, may be duplicated, as they are respectively indicated at 14, 15—15a, 16 and 17 and as in said patent. The parts 8—6—9—10—13—12 and the hereinafter mentioned gear 23 are herein taken as a shifter means for that one of the two instrumentalities (3 and 4—4a) which is moved toward the other, here being the cloth-rest.

Shaft 12 has revoluble thereon a sprocket wheel 18 constantly driven through a chain 19 from a sprocket wheel 20 on the suitably driven drive shaft 21, such sprocket wheel having a pinion 22 which may be regarded as the driver of my mechanism. Fixed on shaft 12 is an internal gear 23, being a part of the revoluble element 12—13—23 of the shifter means. Revoluble on the hub of sprocket wheel 18 is a ratchet wheel 24 carrying a revoluble planet gear 25 meshing with the teeth of both the driver 22 and the revoluble driven element. The driver and said driven element are thus connected planetarily through parts 24 and 25 which are active to drive said element whenever member 24 is held from rotation but ineffective for that purpose when member 24 is free to rotate, at which time planet gear 25 rolls idly around the driver, between it and said element. (I do not wish to be limited to the planet gear being geared with the driven element and revoluble on member 24 as a carrier instead of vice-versa.) The driving impulse should effect one rotation of the driven element (thus to move the cloth-rest from the shearing means, while the seam passes, and then back) and should then terminate, and for this purpose and also to stop the shifter means when one complete revolution of the driven element is accomplished and thereupon hold it releasably until the next impulse the construction is as follows:

On a stud 26 projecting inwardly from the frame 1 is pivoted a two-armed member 27 or pawl one arm 27a of which terminates in a pawl proper arranged in the plane and adapted to catch in the notches of the ratchet wheel or revoluble member 24 and the other arm 27b of which is connected by a link 28 with a detecting device 29, here a lever pivoted in the frame and normally reaching close to the cloth A, so as to lie in the path of the seams A' thereof. The weight of this system of parts, or seam-actuated checking means, normally holds it against a stop 30, and when the detecting device is engaged by a passing seam the consequent rise of said means involves movement of the pawl into catching engagement with member 24 (by which it itself is caught and held) stopping its rotation and hence causing, as explained, the shifting of the cloth-rest from and toward the shearing means. When the shifter means has been made to accomplish one complete cycle (one revolution of the driven element) a peripheral cam 23a on the gear 23 engages the lateral arm 27c of the pawl and represses the later clear of the member 24. For preventing over-run of the shifter means and to keep it (specifically the cloth-rest) stationary until the pawl is again actuated by a passing seam the gear 23 has a peripheral recessed hump 23b in which at this time engages a roller 31a of a lever 31 fulcrumed in the frame and influenced by a spring 32 to hold the roller pressed against the periphery of the gear. The seam having passed, the seam-actuated checking means might fall at once by gravity, which if occurring would of course result in the cloth-rest moving only through a portion of its back-and-forward stroke, being left out of its cooperative relation to the shearing means. Hence I provide a pivoted detent or latch 33 which is urged by a light spring 34 downward and bears against the cam 23a when the gear is at rest, and thereafter, when the gear undergoes motion, against the arm 27c of the pawl. When the pawl is moved inward to checking relation to the member 24, thereby starting the driven element, cam 23a thereby clearing the detent, the latter falls and engaging arm 27c at its shoulder 33a locks the pawl in engagement with said member until the cycle is completed and the cam represses the detent preparatory to disengaging the pawl from said member. In place of the actual ratchet wheel and pawl I may use any revoluble member and means, controlled by the cloth, to arrest the rotation of the revoluble element.

In the present example, it being desired to move one of the mentioned instrumentalities from and quite back toward the other, the arresting action of the means 27 and the holding action of the means 31 become effective when one complete cycle of the driven element has been completed. This is, however, not indispensable in all possible uses of my invention.

The member 24 rotates in the direction of the arrow in Fig. 3. To absorb the shock incident to the pawl engaging this member the pawl arm 27a may be formed as a socket as shown in said figure in which the pawl proper is contained and supported by a spring 35 in the socket.

Having thus fully described my invention what I claim is:

1. The combination of the frame, cloth shearing and cloth guiding instrumentalities therein, a movable shifter means for one instrumentality including a revoluble driven element, a constantly rotated driver coaxial with said element, a revoluble member also coaxial with said element, a planet gear geared with the driver and revoluble on one and geared with the other of said element and member, and means, controlled by the cloth, to hold said member from rotation and thereby impart rotary movement to said element from the driver.

2. The combination of the frame, cloth shearing and cloth guiding instrumentalities therein, a movable shifter means for one instrumentality including a revoluble driven element, a constantly rotated driver coaxial with said element, a revoluble member also coaxial with said element, a planet gear geared with the driver and revoluble on one and geared with the other of said element and member, and means, movable by the cloth into holding engagement with said member, to hold the latter from rotation and thereby impart rotary movement to said element from the driver.

3. The combination of the frame, cloth shearing and cloth guiding instrumentalities therein, a movable shifter means for one instrumentality including a revoluble driven element, a constantly rotated driver coaxial with said element, a revoluble member also coaxial with said element, a planet gear geared with the driver and revoluble on one and geared with the other of said element and member, and means, movable by the cloth into holding engagement with said member, to hold the latter from rotation and thereby impart rotary movement to said element from the driver, the latter means being movable by a part of said shifter means clear of said member when the shifter means has proceeded to a predetermined extent.

4. The combination of the frame, cloth shearing and cloth guiding instrumentalities therein, a movable shifter means for one instrumentality including a revoluble driven element, a constantly rotated driver coaxial with said element, a revoluble member also coaxial with said element, a planet gear geared with the driver and revoluble on one and geared with the other of said element and member, and means, movable by the cloth into holding engagement with said member, to hold the latter from rotation and thereby impart rotary movement to said element from the driver, the latter means being movable by said element clear of said member when the shifter means has proceeded to a predetermined extent.

5. The combination of the frame, cloth shearing and cloth guiding instrumentalities therein, a movable shifter means for one instrumentality including a revoluble driven element, a constantly rotated driver coaxial with said element, a revoluble member also coaxial with said element, a planet gear geared with the driver and revoluble on one and geared with the other of said element and member, means, movable by the cloth into holding engagement with said member, to hold the latter from rotation and thereby impart rotary movement to said element from the driver, and means to check the movement of said shifter means when the same has proceeded to a predetermined extent.

6. The combination of the frame, cloth shearing and cloth guiding instrumentalities therein, a movable shifter means for one instrumentality including a revoluble driven element, a constantly rotated driver coaxial with said element, a revoluble member also coaxial with said element, a planet gear geared with the driver and revoluble on one and geared with the other of said element and member, means, movable by the cloth into holding engagement with said member, to hold the latter from rotation and thereby impart rotary movement to said element from the driver, and means to check the movement of said element when the same has proceeded to a predetermined extent.

7. The combination of the frame, cloth shearing and cloth guiding instrumentalities therein, a movable shifter means for one instrumentality including a revoluble driven element, a constantly rotated driver coaxial with said element, a revoluble member also coaxial with said element, a planet gear geared with the driver and revoluble on one and geared with the other of said element and member, means, movable by the cloth into holding engagement with said member, to hold the latter from rotation and thereby impart rotary movement to said element from the driver, and a detent normally urged to hold the latter means in holding relation to said member, said latter means and the detent being movable to clear the former from said member and retract the detent when said shifter means has been moved a predetermined extent.

8. The combination of the frame, cloth shearing and cloth guiding instrumentalities therein, a movable shifter means for one instrumentality including a revoluble driven element, a constantly rotated driver coaxial with said element, a revoluble member also coaxial with said element, a planet gear geared with the driver and revoluble on one and geared with the other of said element and member, means, movable by the cloth into holding engagement with said member, to hold the latter from rotation and thereby impart rotary movement to said element from the driver, the latter means being movable by a part of said shifter means clear of said member when the shifter means has proceeded to a predetermined extent, and means, when the shifter means has proceeded to such predetermined extent, to check the movement of said shifter means.

In testimony whereof I affix my signature.

GEORGE H. MASON.